(12) United States Patent
Atkinson

(10) Patent No.: US 10,989,656 B2
(45) Date of Patent: Apr. 27, 2021

(54) SCATTEROMETRY SYSTEM AND METHOD OF USING THE SAME

(71) Applicant: 3M INNOVATIVE PROPERTIES COMPANY, St. Paul, MN (US)

(72) Inventor: Matthew R. C. Atkinson, Grant, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 16/611,051

(22) PCT Filed: May 3, 2018

(86) PCT No.: PCT/IB2018/053093
§ 371 (c)(1),
(2) Date: Nov. 5, 2019

(87) PCT Pub. No.: WO2018/203282
PCT Pub. Date: Nov. 8, 2018

(65) Prior Publication Data
US 2020/0124528 A1    Apr. 23, 2020

Related U.S. Application Data

(60) Provisional application No. 62/502,001, filed on May 5, 2017.

(51) Int. Cl.
*G01N 21/47*    (2006.01)

(52) U.S. Cl.
CPC ..... *G01N 21/47* (2013.01); *G01N 2021/4704* (2013.01); *G01N 2021/4735* (2013.01); *G01N 2201/068* (2013.01); *G01N 2201/06113* (2013.01)

(58) Field of Classification Search
CPC .......... G01N 21/47; G01N 2021/4704; G01N 2021/4735; G01N 2021/4711; G01N 2201/068; G01N 15/0211; G01N 2015/1486; G01N 2015/1493; G01N 2015/0294; G01N 2021/4707; G01N 2021/4726; G01N 2021/515
USPC ............ 356/335–343, 426, 73, 237.1–237.5, 356/239.1–239.8
See application file for complete search history.

(56) References Cited

U.S. PATENT DOCUMENTS 4,676,641 A * 6/1987 Bott .................. G01N 15/0205
                                                      250/564
5,198,869 A    3/1993 Monteverde
(Continued)

FOREIGN PATENT DOCUMENTS

CN    102759332    10/2012
JP    2001-083080   3/2001
(Continued)

OTHER PUBLICATIONS

Bodermann, "Optical Metrology of Micro- and Nanostructures at PTB: Status and Future Developments", Proceedings of SPIE, 2008, vol. 7155, pp. 71550V-1-71550V-12, XP055493447.
(Continued)

*Primary Examiner* — Hoa Q Pham

(57) ABSTRACT

Microscatterometry system for generating an angularly resolved scattered light profile from the collected data.

14 Claims, 1 Drawing Sheet

(56) References Cited

U.S. PATENT DOCUMENTS

| | | | |
|---|---|---|---|
| 6,118,532 A * | 9/2000 | Peters | G01J 3/4412 |
| | | | 356/338 |
| 6,294,327 B1 | 9/2001 | Walton | |
| 7,630,086 B2 | 12/2009 | Oak | |
| 8,625,093 B2 * | 1/2014 | Yamaguchi | G01N 21/21 |
| | | | 356/336 |
| 9,329,082 B2 * | 5/2016 | Welz | G01N 21/51 |
| 9,604,492 B2 * | 3/2017 | Bookbinder | B43L 1/00 |
| 9,960,389 B1 * | 5/2018 | Hao | C09J 7/10 |
| 2008/0151228 A1 | 6/2008 | Hugers | |
| 2009/0079969 A1 | 3/2009 | Chou | |
| 2010/0188651 A1 | 7/2010 | Kostuch | |
| 2010/0226524 A1 | 9/2010 | Shakespeare | |
| 2011/0276299 A1 | 11/2011 | Nemoto | |
| 2012/0019835 A1 | 1/2012 | Nakao | |
| 2013/0293897 A1 | 11/2013 | Xu | |
| 2015/0260648 A1 | 9/2015 | Xu | |
| 2020/0023738 A1 * | 1/2020 | Black | H05K 5/03 |

FOREIGN PATENT DOCUMENTS

| | | |
|---|---|---|
| WO | WO 2011-082069 | 7/2011 |
| WO | WO 2016-181592 | 11/2016 |

OTHER PUBLICATIONS

Endres, "Numerical Investigations of the Influence of Different Commonly Applied Approximations in Scatterometry", Proceedings of SPIE, May 13, 2013, vol. 8789, pp. 878904-1-878904-9, XP055493434.

Jordan, "Analytical First-Order Model of Light Scattering from Submicron Pyramidal Pits", Proceedings of SPIE, Jun. 5, 2001, vol. 4275, pp. 138-146, XP055493436.

Scholze, "Determination of Line Profiles on Photomasks using DUV, EUV, and X-ray Scattering", Visual Communications and Image Processing, Proceedings of SPIE, Oct. 12, 2014, vol. 9231, pp. 9231M0-1-9231M0-11, XP060041887.

International Search Report for PCT International Application No. PCT/162018/053093, dated Jul. 26, 2018, 4pgs.

* cited by examiner

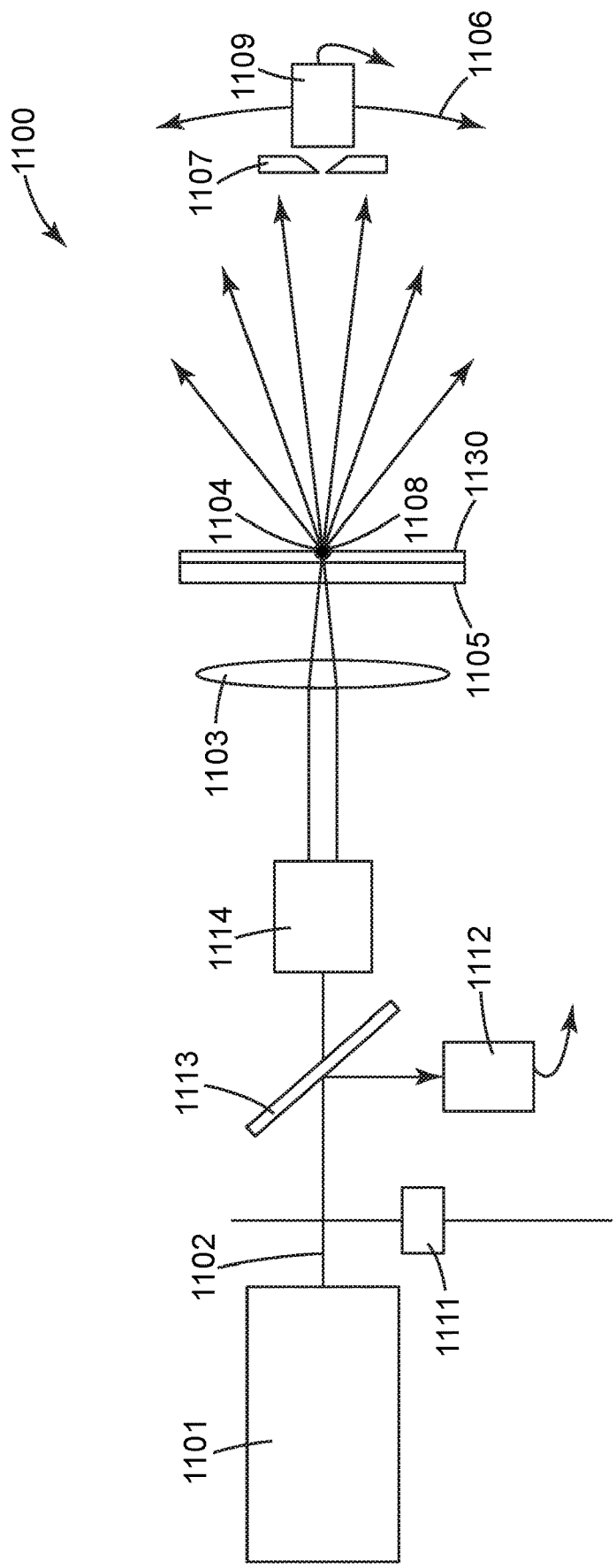

SCATTEROMETRY SYSTEM AND METHOD OF USING THE SAME

CROSS REFERENCE TO RELATED APPLICATION

This application claims the benefit of U.S. Provisional Patent Application No. 62/502,001, filed May 5, 2017, the disclosure of which is incorporated by reference herein in its entirety.

BACKGROUND

A variety of techniques for measuring optical characteristics of samples that are transmissive and/or reflective to at least one wavelength of light in a range from 400 nm to 700 nm are known in the art.

Scatterometry is a set of techniques where light that is scattered away from the specular reflection or in-line transmission directions is measured. Scatterometry is used, for example, to measure and monitor the degree of glossiness of a polished surface (e.g., semiconductor wafers and metals).

Scatterometry can also be used to measure the functional performance of polymer films (e.g., polymeric optical films used in optical devices such as screens on personal devices). Some materials, such as optically clear adhesives, perform better when they scatter a minimal amount of light away from the in-line transmission direction. For materials known as optical diffusers, a moderate to high amount of scatter with a particular angular distribution of scattered light is desirable.

Current techniques for measuring the intensity of light scattered in specific directions include those disclosed in ASTM E430-11 (2011). Such measurements can then be used to define the sample haze (i.e., the ratio of light scattered in a specific direction to the unscattered light). In this method, an illuminated area of the sample in the mm to cm size scale is used and provides area averages of the scatter in specific directions.

Other methods known in the art include measuring the scattered light distribution (i.e., the intensity of scattered light as a function of angle away from the in-line direction with relatively high (typically, at least 0.2°) angular accuracy). Such methods are useful, for example, for investigating the exact scattered light profile which contains more information about the sample than do measurements at a few discrete angles (e.g., whether there are oscillations in the scatter profile indicating a thin layer or diffractive features on the sample). The full scattered light profile obtained with these methods provides more in-depth characterization and analysis of the sample. These methods use a collimated beam incident on the sample, and thus provide measurements with lateral resolution at best on the order of 1 mm (the diameter of the incident collimated beam).

To improve the lateral resolution of scatterometry measurements beyond the two basic approaches described, the beam can be focused onto the sample. The beam that is reflected from or transmitted through the sample, however, has a natural divergence that must be accounted for. The focused scatterometry approach collects the diverging specular reflected or in-line transmitted light, as well as light that is scattered at a few discrete angles. The focused scatterometry provides specific haze values, but does not provide high angular resolution measurements.

SUMMARY

It is desirable, for example, for polymer films and materials used in display devices to have both relatively high angular resolution (typically, at least 0.2°) for determining the exact behavior of light in the system and relatively high lateral resolution (typically at least 0.1 mm) for quantifying variations in the scatter profile on the size scale of display pixels. A system and method for providing both relatively high angular and relatively high lateral resolution is desired.

In one aspect, the present disclosure describes a microscatterometry system comprising, in order:
 a light source that provides at least one wavelength of light in a range from 400 nm to 700 nm (in some embodiments, in a range from 442 nm to 633 nm; in some embodiments, at a wavelength of 532 nm);
 a focusing element;
 a sample holder;
 an aperture (e.g., a variable width aperture); and
 a first light detector rotatable about a eucentric point, wherein when the light source is energized, a light beam (i.e., at least one light beam) from the light source passes through and is focused by the focusing element to a spot having an area in a range from 1 micrometer squared to 625 micrometers squared (in some embodiments, 25 micrometers squared to 225 micrometers squared; in some embodiments, 100 micrometers squared) focused at the eucentric point of the first detector, wherein the focused light diverges after the focal point and the diverging light passes through the aperture before contacting the first light detector, and wherein the sample holder is translatable in a plane orthogonal to the incident light beam.

In another aspect, the present disclosure describes a method of microscatterometry, the method comprising:
 providing a system comprising, in order:
 a light source;
 a focusing element;
 a sample that is at least one of transmissive or reflective of light of at least one wavelength in a range from 400 nm to 700 nm;
 an aperture (e.g., a variable width aperture); and
 a first light detector rotatable about a eucentric point,
 energizing the light source to provide a light beam (i.e., at least one light beam) having at least one wavelength of light in a range from 400 nm to 700 nm (in some embodiments, in a range from 442 nm to 633 nm; in some embodiments, at a wavelength of 532 nm), wherein the light beam from the light source passes through and is focused by the focusing element to a spot either on or within the sample having an area in a range from 1 micrometer squared to 625 micrometers squared (in some embodiments, 25 micrometers squared to 225 micrometers squared; in some embodiments, 100 micrometers squared), wherein the sample holder translates in a plane orthogonal to the incident light beam, and wherein at least a portion of the light is transmitted through or reflected by the sample to provide scattered light; and
 rotating the first light detector about the eucentric point and collecting data generated by the scattered light passing through the aperture onto the first light detector.

Embodiments of the microscatterometry system, and method for using the same, can desirably provide, for example, both relatively high angular and relatively high lateral resolution. The method is useful, for example, for generating an angularly resolved scattered light profile from the collected data.

BRIEF DESCRIPTION OF THE DRAWING

The FIGURE is a schematic of an exemplary apparatus described herein.

DETAILED DESCRIPTION

The microscatterometry system, and methods described herein, are useful, for example, for providing analysis of samples such as polymeric materials (e.g., polymer optical films), ceramics (including glass), metals, semiconductors, and paper. The analysis may be on samples that are transmissive or reflective of light of at least one wavelength in a range from 400 nm to 700 nm.

Referring to the FIGURE, exemplary microscatterometry system 1100 includes light source 1101, focusing element 1103, sample holder 1105, aperture 1107, first light detector 1109 rotatable (1106) about eucentric point 1108. As shown, microscatterometry system 1100 also includes optional optical chopper 1111, optional light beam splitter 1113 used with optional second light detector 1112, and optional beam expanding spatial filter 1114. When light source 1101 is energized, light beam 1102 passes through and is focused by focusing element 1103 to a spot having an area in a range from 1 micrometer squared to 625 micrometers squared (in some embodiments, 25 micrometers squared to 225 micrometers squared; in some embodiments, 100 micrometers squared) focused at eucentric point 1108. The focused light diverges after focal point 1104. The diverging light passes through aperture 1107 before contacting first light detector 1109. Sample holder 1105 is translatable in a plane orthogonal to incident light beam 1102. As shown, sample holder 1105 has sample 1130 mounted therein. Sample 1130 is at least one of transmissive or reflective of light of at least one wavelength in a range from 400 nm to 700 nm. Light beam 1102 from light source 1101 passes through and is focused by focusing element 1103 to a spot either on or within sample 1130 having an area in a range from 1 micrometer squared to 625 micrometers squared (in some embodiments, 25 micrometers squared to 225 micrometers squared; in some embodiments, 100 micrometers squared).

During operation for a transmissive sample, sample holder 1105 translates such that a portion of sample holder 1105 remains at eucentric point 1108, and optionally rotates about eucentric point 1108. During operation with a reflective sample, sample holder 1105 translates such that a portion of sample holder 1105 remains at eucentric point 1108, and rotates about eucentric point 1108. At least a portion of the light is transmitted through or reflected by sample 1130 to provide scattered light.

During operation, first light detector 1109 rotates (1106) about eucentric point 1108 and collects data generated by the scattered light passing through aperture 1107 onto first light detector 1109. In some embodiments for analyzing transmissive samples, an optical axis extends along the incident light beam from the light source towards the sample holder, and is perpendicular to both the lens and the sample holder, and the first light detector is rotatable about the eucentric point in a range from −90° to 90° (in some embodiments, in a range from −45° to 45°, −20° to 20°, −20° to 5°, −10° to 10°, or even −6° to 6°) with respect to the optical axis. In some embodiments, for analyzing reflective samples, there is a specular direction (i.e., a direction equal to an angle between an optical axis extending along the incident light beam from the light source towards the sample holder and the direction normal to the sample holder, located in the plane defined by the incident light beam and the normal to the sample holder, on the opposite side of the normal to the sample holder to the incident light beam), and the first light detector is rotatable about the eucentric point in a range from −90° to 90° (in some embodiments, in a range from −45° to 45°, −20° to 20°, −20° to 5°, −10° to 10°, or even −6° to 6°) with respect to the specular direction. In general, the glossier the sample, the narrower the range the first light detector is rotated.

Data from methods described herein is useful for determining a variety of optical characteristics of a sample, including distinctness-of-image (DOI), narrow-angle haze, wide-angle haze, transmission haze, transmission clarity, specular gloss (for reflection) on a microscale (i.e., less than 1 mm (in some embodiments, less than 0.5 mm, or even less than 0.1 mm)). DOI is a method of characterizing the degree of glossiness of a surface by looking at the amount of light scattered slightly out of the in-line direction (for transmission) or specular direction (for reflection). It can be used to distinguish between very glossy materials that would have negligible scattering at higher angles, which could not be distinguished with haze measuring instruments. This variation in glossiness is important in surface finishes that are intended to be glossy (i.e., polished surfaces). DOI is light that is spread 0.3° from specular (or in-line), and is calculated from the formula, $100 \times (1 - H_{0.3})$, where $H_{0.3}$ is the ratio of intensity measured at 0.3° from specular to the measured intensity in the specular direction, $H_{0.3} = I_{specular+/-0.3}/I_{specular}$.

Narrow-angle haze is light that is spread at 2° from specular (or in-line), and is calculated from the formula, $100 \times H_2$, where $H_2$ is the ratio of intensity measured at 2.0° from specular to the measured intensity in the specular direction. Narrow angle haze is used to characterize samples when there are moderate amounts of scatter close to specular, but negligible amounts at high angle.

Wide-angle haze is used to characterize and distinguish between samples that generally have large amounts of scatter, where the narrow-angle haze and distinctness of image characterizations would not be able to useful. Wide-angle haze is light that is spread at a specified degree from specular (or in-line), and is calculated from the formula, $100 \times H_5$, or $100 \times H_{15}$, where $H_5$ and $H_{15}$ are the ratios of intensity measured at 5.0° and 15.0°, respectively, from specular to the measured intensity in the specular direction, respectively.

Transmission haze is light that is scattered more than 2.5° from collimated direction, and is calculated from the formula, $T_d/T_t \times 100$ (where $T_d$=diffuse transmittance, $T_t$=total transmittance).

Transmission clarity is light that is scattered less than 2.5° from collimated direction, which is normalized to the direct beam intensity with no sample in place.

Specular gloss (for reflection) is the specular intensity, for 20° or 30° incidence and detection, and is calculated as $R_{s,20}$ or $R_{s,30}$ (specular intensity measured at 20° or 30°).

Embodiments of the microscatterometry system, and methods described herein, are particularly useful for determining the micro-haze of polymeric materials (e.g., polymer optical films), ceramics (including glass), metals, semiconductors, and paper. Polymeric optical films, for example, are used in a variety of devices, including small-screen devices such as cell phones, personal display devices (PDAs), and digital cameras. Some of these devices use organic light emitting diodes (OLEDs) for lighting. Currently the dominant market OLED choice is active-matrix organic light-emitting diodes (AMOLED) for such handheld devices. Such handheld devices have a top-emissive architecture and currently do not use any light extraction method except for employing strong microcavity. This strong cavity design can have high light efficiency, but the angular color uniformity is much worse, when compared to that of liquid crystal displays (LCDs).

Typically, the color for an OLED screen shifts greatly as the viewing angle increases away from normal incidence, but an LCD display shifts only slightly. This is a visually evident difference between the two display technologies. How to improve the angular color uniformity remains a challenge for AMOLED displays with strong cavity design. Moderate optical differs can perform this function, and it is helpful that these differs are spatially uniform.

The visually perceived quality of a pixelated display requires a particular uniformity of the controlled haze for spatial distributions on the order of the length scale of the display pixels. Non-uniformity of the haze above the order of length scale of the display pixels can lead to optical defects such as pixel blur or so-called sparkle. This quality of a sample (e.g., a polymeric optical film) is measureable via a micro-haze uniformity measurement using a microscatterometry system. A microscatterometry system and method for using the system, are described herein (see "Optical Property Test Method: Micro-Haze Uniformity" described in the Examples, below). This test method provides measurements from a sampling beam illuminating a few tens of microns of the sample. In this measurement, the polymeric film surface is scanned with an optical probe that has sub-pixel dimensions while measuring standard deviation in the measured micro-haze levels. This micro-haze measurement technique allows sample analysis for spatial frequencies corresponding to the peak for human vision perception—namely, spatial frequencies in the range of 1-5 line pairs per millimeter for typical viewing distances. The micro-haze measurements allow the examination of size scale variations on the size scale for display pixel dimensions. In contrast, conventional haze measurement systems analyze a large area of the optical film for each measurement and are unable to distinguish visually perceived differences on the critical length scales for pixelated displays.

Components of the apparatus described herein can be made by techniques known in the art and/or are commercially available, for example, from Melles Griot, Carlsbad, Calif. or Newport Corporation, Irvine, Calif.

The light source provides at least one wavelength of light in a range from 400 nm to 700 nm (in some embodiments, in a range from 442 nm to 633 nm; in some embodiments, at a wavelength of 532 nm). Exemplary light sources include lasers (including pulsed lasers), light emitting diodes (LEDs) and arc lamps. Typically, laser light sources have a power rating for light incident on the sample in a range from 1 milliwatt to 50 milliwatts (in some embodiments, in a range from 1 milliwatt to 25 milliwatts; in some embodiments, a power rating of 10 milliwatts). Exemplary lasers are available, for example, from Melles Griot as Model 85-GCB-020, 532 nm 20 mW DPSS laser. Typically, arc lamps have a power rating on the order of watts. Exemplary arc lamps are available, for example, from Thorlabs Inc., Newton, N.J., under the trade designation "SLS4001 XENON SHORT-ARC LIGHT SOURCE" (1.3 watt).

Exemplary focusing elements include lenses (e.g., an objective lens, a singlet lens, or a doublet lens), spatial light modulators, and parabolic mirrors. Such focusing elements are known in the art and can be made or obtained commercially. Exemplary lenses are available, for example, from Newport Corporation (e.g., under the trade designation "PAC058 ACHROMATIC DOUBLET" (1-inch diameter, 150 mm focal length)). Exemplary spatial light modulators are available, for example, under the trade designations "EXULUS SPATIAL LIGHT MODULATOR" from Thorlabs Inc.; "LC 2012" from Holoeye Photonics AG, San Diego, Calif. Exemplary parabolic mirrors are available, for example, under the trade designations "12.7×6.35 mm PFL 90° OFF-AXIS PARABOLIC GOLD MIRROR" from Edmund Optics, Barrington, N.J.; "MPD00M9-F01 90° OFF-AXIS PARABOLIC MIRROR" from Thorlabs Inc.

In some embodiments, the aperture is a variable aperture (available, for example, under the trade designation "COMPACT ADJUSTABLE WIDTH SLIT M-SV-0.5" from Newport Corporation).

The microscatterometry system includes a first light detector that rotates about a eucentric point. In some embodiments for analyzing transmissive samples, an optical axis extends along the incident light beam from the light source towards the sample holder, and is perpendicular to both the lens and the sample holder, and the first light detector is rotatable about the eucentric point in a range from −90° to 90° (in some embodiments, in a range from −45° to 45°, −20° to 20°, −20° to 5°, −10° to 10°, or even −6° to 6°) with respect to the optical axis. In some embodiment, for analyzing reflective samples, there is a specular direction (i.e., a direction equal to an angle between an optical axis extending along the incident light beam from the light source towards the sample holder and the direction normal to the sample holder, located in the plane defined by the incident light beam and the normal to the sample holder, on the opposite side of the normal to the sample holder to the incident light beam), and the first light detector is rotatable about the eucentric point in a range from −90° to 90° (in some embodiments, in a range from 45° to 45°, −20° to 20°, −20° to 5°, −10° to 10°, or even −6° to 6°) with respect to the specular direction. Suitable detectors are available, for example, under the trade designation "NEW FOCUS LARGE-AREA PHOTO RECEIVER," Model 2031, from Newport Corporation.

Optionally, the microscatterometry system includes an optical chopper. Optical choppers are used in conjunction with lock-in amplifiers, where the optical chopper modulates the probe beam, and thus the scattered light, and the lock-in amplifier, measure only the signal detected at the chopping frequency. This is used to increase the signal to noise of the system by rejecting variations in the background light and electronic noise from the detector. Typically, the optical chopper is positioned between the light source and the focusing element. An alternative to using an optical chopper is to use a pulsating light source. In some embodiments, the optical chopper is a mechanical modulator or an acousto-optic modulator. Optical choppers are known in the art and can be made or obtained commercially. Exemplary optical choppers are available, for example, under the trade designation "NEW FOCUS 3501 OPTICAL CHOPPER" from Newport Corporation. In some embodiments, the optical chopper is positioned between the light source and a beam expanding spatial filter.

Optionally, the microscatterometry system includes a beam expanding spatial filter positioned between the light source and the focusing element. Often lasers do not produce a beam with a smooth regular intensity profile. If used as-is, these variations can be misinterpreted as features in a scattered light profile. Spatial filters are used to remove irregularities in the beam profile, thus improving the quality of the scattered light profile. In the spatial filter, the input light is focused towards a small pinhole, and the pinhole acts as a point source for light transmitted through it. The now diverging light is then collimated with a lens positioned a focal length away from the pinhole. Often, a focal length is used such that the now collimated beam is larger in diameter than the beam produced by the laser. A larger beam better fills a focusing lens further along the beam, which produces a smaller focused spot than would be produced by the original diameter beam. Exemplary spatial filters and beam expanders are available, for example, under the trade designation "COMPACT FIVE-AXIS SPATIAL FILTER MODEL 910A," from Newport Corporation, used with a collimating lens achromatic doublet (1-inch diameter, 50.8 mm focal length; available under the under the trade designation "PAC040") from Newport Corporation. In some embodiments, the beam expanding spatial filter is positioned between a light beam splitter and the focusing element.

Optionally, the microscatterometry system includes a second light detector. Such a light detector is available, for example, under the trade designation "NEW FOCUS LARGE-AREA PHOTORECEIVER," Model 2031, from Newport Corporation. The second detector is used to monitor variations in the intensity of the light beam coming from the light source. In some embodiments, the light beam splitter transmits about 90% of the light beam towards the focusing element and reflects about 10% of the light beam towards the second detector. The signal from the first detector is divided by the signal from the second detector, to account for variations in the intensity of the light beam.

In some embodiments, the second light detector is positioned between the light source and the focusing element. In some embodiments, the second light detector is positioned between an optical chopper and the focusing element.

If a second light detector is used, a light beam splitter is used to split a portion of the light beam to the second light detector. Exemplary light beam splitters are available, for example, under the trade designations "UV FUSED SILICA METALLIC NEUTRAL DENSITY FILTER FQR-ND01" or "BROADBAND BEAM SAMPLER 10B20NC.1" from Newport Corporation.

Other components for the microscatterometry system are available, for example, from commercial sources. Such other components include sample mounts (e.g., a spring loaded mount (available, for example, under the trade designation "M-PPF50" from Newport Corporation)), sample stages (e.g., linear translation stages (available, for example, under the trade designation "MFA-1C" from Newport Corporation)), detector stages (available, for example, under the trade designation "ROTATION STAGE RV350PE" from Newport Corporation), goniometric stages (available, for example, under the trade designation "GONIOMETRIC STAGE BGM 160 PE" from Newport Corporation), stage drivers (for sample and detector stages (available, for example, under the trade designation "UNIVERSAL MOTION CONTROLLER ESP300" from Newport Corporation)), and detection electronics (available, for example, under the trade designation "ANALOG-TO-DIGITAL CONVERTER NI 9215, CDAQ 9172 CHASSIS" from National Instruments, Austin Tex.).

Exemplary Embodiments

1A. A microscatterometry system comprising, in order:
a light source that provides at least one wavelength of light in a range from 400 nm to 700 nm (in some embodiments, in a range from 442 nm to 633 nm; in some embodiments, at a wavelength of 532 nm);
a focusing element;
a sample holder;
an aperture (e.g., a variable width aperture); and
a first light detector rotatable about a eucentric point, wherein when the light source is energized, a light beam (i.e., at least one light beam) from the light source passes through and is focused by the focusing element to a spot having an area in a range from 1 micrometer squared to 625 micrometers squared (in some embodiments, 25 micrometers squared to 225 micrometers squared; in some embodiments, 100 micrometers squared) focused at the eucentric point of the first light detector, wherein the focused light diverges after the focal point and the diverging light passes through the aperture before contacting the first light detector, and wherein the sample holder is translatable in a plane orthogonal to the incident light beam.

2A. The microscatterometry system of Exemplary Embodiment 1A, wherein the light source is a laser.

3A. The microscatterometry system of Exemplary Embodiment 2A, wherein the light source has a power rating in a range from 1 milliwatt to 50 milliwatts (in some embodiments, in a range from 1 milliwatt to 25 milliwatts; in some embodiments, a power rating of 10 milliwatts).

4A. The microscatterometry system of any preceding A Exemplary Embodiment, wherein the focusing element is a lens (e.g., an objective lens, a singlet lens, or a doublet lens).

5A. The microscatterometry system of any of Exemplary Embodiments 1A to 3A, wherein the focusing element is a spatial light modulator.

6A. The microscatterometry system of any of Exemplary Embodiments 1A to 3A, wherein the focusing element is parabolic mirror.

7A. The microscatterometry system of any preceding A Exemplary Embodiment, further comprising an optical chopper positioned between the light source and the focusing element.

8A. The microscatterometry system of Exemplary Embodiment 7A, wherein the optical chopper is a mechanical modulator.

9A. The microscatterometry system of Exemplary Embodiment 7A, wherein the optical chopper is an acousto-optic modulator.

10A. The microscatterometry system of any of Exemplary Embodiments 7A to 9A, further comprising a light beam splitter positioned between the optical chopper and the focusing element to split a portion of a light beam to a second light detector.

11A. The microscatterometry system of Exemplary Embodiment 10A, further comprising a beam expanding spatial filter positioned between the light source and the focusing element (e.g., between a light beam splitter and the focusing element).

12A. The microscatterometry system of any of Exemplary Embodiments 1A to 6A, further comprising a light beam splitter positioned between the light source and the focusing element to split a portion of a light beam to a second light detector.

13A. The microscatterometry system of Exemplary Embodiment 12A, further comprising a beam expanding spatial filter positioned between the light beam splitter and the focusing element.

14A. The microscatterometry system of either Exemplary Embodiment 12A or 13A, wherein the light beam is comprised of pulsed light.

15A. The microscatterometry system of any of Exemplary Embodiments 1A to 6A, further comprising a beam expanding spatial filter positioned between the light source and the focusing element.

16A. The microscatterometry system of Exemplary Embodiment 15A, further comprising an optical chopper positioned between the light source and the beam expanding spatial filter.

17A. The microscatterometry system of Exemplary Embodiment 16A, wherein the optical chopper is a mechanical modulator.

18A. The microscatterometry system of Exemplary Embodiment 16A, wherein the optical chopper is an acousto-optic modulator.

19A. The microscatterometry system of Exemplary Embodiments 15A, wherein the light beam is comprised of pulsed light.

20A. The microscatterometry system of any preceding A Exemplary Embodiment, wherein an optical axis extends from the light source (i.e., from where the light emits from the light source when energized) toward the sample holder, and is perpendicular to both the lens and the sample holder, and wherein the first light detector is rotatable about the eucentric point in a range from −90° to 90° (in some embodiments, in a range from −45° to 45°, −20° to 20°, −20° to 5°, −10° to 10°, or even −6° to 6°) with respect to the optical axis.

21A. The microscatterometry system of any preceding A Exemplary Embodiment having a specular direction (i.e., a direction equal to an angle between an optical axis extending along the incident light beam from the light source towards the sample holder and the direction normal to the sample holder, located in the plane defined by the incident light beam and the normal to the sample holder, on the opposite side of the normal to the sample holder to the incident light beam), wherein the first light detector is rotatable about the eucentric point in a range from −90° to 90° (in some embodiments, in a range from −45° to 45°, −20° to 20°, −20° to 5°, −10° to 10°, or even −6° to 6°) with respect to the specular direction.

1B. A method of microscatterometry, the method comprising:
  providing a system comprising, in order:
   a light source;
   a focusing element;
   a sample that is at least one of transmissive or reflective of light of at least one wavelength in a range from 400 nm to 700 nm;
   an aperture (e.g., a variable width aperture); and
   a first light detector rotatable about a eucentric point,
   energizing the light source to provide a light beam (i.e., at least one light beam) having at least one wavelength of light in a range from 400 nm to 700 nm (in some embodiments, in a range from 442 nm to 633 nm; in some embodiments, at a wavelength of 532 nm), wherein the light beam from the light source passes through and is focused by the focusing element to a spot either on or within the sample having an area in a range from 1 micrometer squared to 625 micrometers squared (in some embodiments, 25 micrometers squared to 225 micrometers squared; in some embodiments, 100 micrometers squared), wherein the sample holder translates in a plane orthogonal to the incident light beam, and wherein at least a portion of the light is transmitted through or reflected by the sample to provide scattered light; and
   rotating the first light detector about the eucentric point and collecting data generated by the scattered light passing through the aperture onto the first light detector.

2B. The method of Exemplary Embodiment 1B, further comprising generating an angularly resolved scattered light profile from the collected data.

3B. The method of any preceding B Exemplary Embodiment, wherein the light source is a laser.

4B. The method of Exemplary Embodiment 3B, wherein the light source has a power rating in a range from 1 milliwatt to 50 milliwatts (in some embodiments, in a range from 1 milliwatt to 25 milliwatts; in some embodiments, a power rating of 10 milliwatts).

5B. The method of any preceding B Exemplary Embodiment, wherein the focusing element is a lens (e.g., an objective lens, a singlet lens, or a doublet lens).

6B. The method of any of Exemplary Embodiments 1B to 4B, wherein the focusing element is a spatial light modulator.

7B. The method of any of Exemplary Embodiments 1B to 4B, wherein the focusing element is a parabolic mirror.

8B. The method of any preceding B Exemplary Embodiment, further comprising an optical chopper positioned between the light source and the focusing element, wherein the method further comprises chopping the light beam with the optical chopper.

9B. The method of Exemplary Embodiment 8B, wherein the optical chopper is a mechanical modulator.

10B. The method of Exemplary Embodiment 8B, wherein the optical chopper is an acousto-optic modulator.

11B. The method of any of Exemplary Embodiments 1B to 7B, further comprising a light beam splitter positioned between the optical chopper and the focusing element to split a portion of the light beam to a second light detector, wherein the method further comprises the light beam splitter splitting a portion of the light beam to the second light detector.

12B. The method of Exemplary Embodiment 11B, further comprising a beam expanding spatial filter positioned between the light source and the focusing element (e.g., between the light beam splitter and the focusing element), wherein the method further comprises filtering and expanding the light beam with the beam expanding spatial filter.

13B. The method of any of Exemplary Embodiments 1B to 7B, further comprising a light beam splitter positioned between the light source and the focusing element to split a portion of the light beam to a second light detector, wherein the method further comprises the light beam splitter splitting a portion of the light beam to the second light detector.

14B. The method of Exemplary Embodiment 13B, further comprising a beam expanding spatial filter positioned between the light beam splitter and the focusing element, wherein the method further comprises filtering and expanding the light beam with the beam expanding spatial filter.

15B. The method of either Exemplary Embodiment 13B or 14B, wherein the light beam is comprised of pulsed light.

16B. The method of any of Exemplary Embodiments 1B to 7B, further comprising a beam expanding spatial filter positioned between the light source and the focusing element, wherein the method further comprises filtering and expanding the light beam with the beam expanding spatial filter.

17B. The method of Exemplary Embodiment 16B, further comprising an optical chopper positioned between the light source and the beam expanding spatial filter, wherein the method further comprises chopping the light beam with the optical chopper.

18B. The method of Exemplary Embodiment 17B, wherein the optical chopper is a mechanical modulator.

19B. The method of Exemplary Embodiment 17B, wherein the optical chopper is an acousto-optic modulator.

20B. The method of Exemplary Embodiment 19B, wherein the light beam is comprised of pulsed light.

21B. The method of any preceding B Exemplary Embodiment, wherein an optical axis extends along the incident light beam from the light source towards the sample holder, and is perpendicular to both the lens and the sample holder, and wherein the first light detector is rotatable about the eucentric point in a range from −90° to 90° (in some embodiments, in a range from −45° to 45°, −20° to 20°, −20° to 5°, −10° to 10°, or even −6° to 6°) with respect to the optical axis.

22B. The method of any preceding B Exemplary Embodiment having a specular direction (i.e., a direction equal to an angle between an optical axis extending along the incident light beam from the light source towards the sample holder and the direction normal to the sample holder, located in the plane defined by the incident light beam and the normal to the sample holder, on the opposite side of the normal to the sample holder to the incident light beam), wherein the first light detector is rotatable about the eucentric point in a range from −90° to 90° (in some embodiments, in a range from −45° to 45°, −20° to 20°, −20° to 5°, −10° to 10°, or even −6° to 6°) with respect to the specular direction.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials for preparing samples to be tested in the Examples include those listed in Table 1, below.

TABLE 1

| Designation | Description | Source |
| --- | --- | --- |
| "EHA" | 2-Ethylhexyl acrylate | BASF, Florham Park, NJ |
| "HEA" | 2-Hydroxyethyl acrylate | BASF |
| "HDDA" | 1,6-Hexandiol diacrylate | BASF |
| "iBOA" | Isobornyl acrylate | Osaka Chemical Company, Osaka, Japan |
| "KBM-403" | 3-Glycidoxypropyl trimethoxysilane | Shin-etsu Silicones of America, Inc., Akron, OH |
| "RF02N" | Silicone coated polyester release liner | SKC Haas Display Films, Co. Ltd., Cheonan-si, South Korea |
| "RF12N" | Silicone coated polyester release liner | SKC Haas Display Films, Co. Ltd. |
| "D-1173" | 2-Hydroxy-2-methyl-1-phenyl-propan-1-one | BASF |
| "IRGACURE 651" | Alpha, alpha-dimethoxy-alpha-phenylacetophenone | BASF |
| "TOSPEARL 120A" | Silicone beads (2.0 micrometers, monodispersed) | Momentive Performance Materials, Waterford, NY |
| "TOSPEARL 145" | Silicone beads (4.5 micrometers, monodispersed) | Momentive Performance Materials |
| "BA" | Butyl acrylate | BASF |
| "VAZO 67" | 2,2'-Azobis(2-methylbutyronitrile) | E.I. Du Pont de Nemours and Company, Wilmington, DE |

Optical Property Test Method: Micro-Haze Uniformity

Haze can be measured on a small lateral scale by focusing a probe beam onto the surface of the sample such that the focused spot is, for example, on the order of 10 micrometers or less. This approach of interrogating a small area of the sample is referred to herein as micro-haze. The micro-haze measurement technique allows sample analysis for spatial frequencies corresponding to the peak for human vision perception and on the length scale of the display pixels. Standard haze measurement systems analyze a large area of the optical film and do not show differences on the critical length scales for pixelated displays.

The microscatterometry system used to determine the micro-haze of various samples is shown in the FIGURE. Referring to the FIGURE, microscatterometry system 1100 included laser light source 1101 (obtained from Melles Griot, Carlsbad, Calif., as Model 85-GCB-020, 532 nm 20 mW DPSS laser), optical chopper (for chopping the light beam) 1111 (obtained under the trade designation "NEW FOCUS 3501 OPTICAL CHOPPER" from Newport Corporation, Irvine, Calif.), light beam splitter 1113 (obtained under the trade designation "UV FUSED SILICA METALLIC NEUTRAL DENSITY FILTER FQR-ND01" from Newport Corporation), second light detector 1112 (obtained under the trade designation "NEW FOCUS LARGE-AREA PHOTORECEIVER," Model 2031, from Newport Corporation), beam expanding spatial filter (filtering and expanding the light beam) 1114 (obtained under the trade designation "COMPACT FIVE-AXIS SPATIAL FILTER MODEL 910A" from Newport Corporation) used with collimating lens achromatic doublet (1-inch diameter, 50.8 mm focal length; obtained under the under the trade designation "PAC040" from Newport Corporation), focusing lens 1103 (1 inch diameter, 150 mm focal length; obtained under the trade designation "PAC058 ACHROMATIC DOUBLET" from Newport Corporation), sample holder 1105 (a spring loaded mount (obtained under the trade designation "M-PPF50" from Newport Corporation)), sample to be tested 1130, variable aperture 1107 (obtained under the trade designation "COMPACT ADJUSTABLE WIDTH SLIT M-SV-0.5" from Newport Corporation), first light detector 1109 (obtained under the trade designation "NEW FOCUS LARGE-AREA PHOTO RECEIVER," Model 2031, from Newport Corporation) rotatable (1106) from at least −90° to 90° about eucentric point 1108 in a plane parallel to the ground, and −45° to 45° about the same eucentric point 1108 in an orthogonal plane.

Other components of the microscatterometry system included a linear translation stage (obtained under the trade designation "MFA-1C" from Newport Corporation), detector stages (obtained under the trade designation "ROTATION STAGE RV350PE" from Newport Corporation), goniometric stage (obtained under the trade designation "GONIOMETRIC STAGE BGM 160 PE" from Newport Corporation), stage drivers (for sample and detector stages (obtained under the trade designation "UNIVERSAL MOTION CONTROLLER ESP300" from Newport Corporation)), and detection electronics (obtained under the trade designation "ANALOG-TO-DIGITAL CONVERTER NI 9215, CDAQ 9172 CHASSIS" from National Instruments, Austin, Tex.).

When light source 1101 was energized, light beam 1102 passed through and was focused by focusing lens 1103 to a spot having a 10-micrometer spot diameter focused at eucentric point 1108. The focused light diverged after focal point 1104. The diverging light passed through aperture 1107 before contacting first light detector 1109. Sample holder 1105 translated in a plane orthogonal to the incident light beam 1102. Light beam splitter 1113 was used to split light beam 1102 to second light detector 1112. Light beam splitter 1113 transmitted about 90% of light beam 1102 towards focusing element 1103 and reflected about 10% of light beam 1102 towards second detector 1112. Second detector 1112 was used to monitor variations in the intensity of light beam 1102 coming from light source 1101. The signal from first detector 1109 was divided by the signal from second detector 1112, to account for variations in the intensity of light beam 1102.

During operation, sample holder 1105 translated such that a portion of sample holder 1105 remained at eucentric point 1108, and rotated about eucentric point 1108.

During operation, first light detector 1109 rotated (1106) about eucentric point 1108 and collected data generated by the scattered light passing through aperture 1107 onto first light detector 1109.

A probe wavelength of 532 nanometers (nm) was used to obtain the approximately 10-micrometer focused spot diameter by using a 154-mm focal length lens using the diameter of an Airy disc (spot diameter=2.44×wavelength×focal length/beam diameter).

The sample was physically scanned relative to the focused spot to take measurements across the film surface and gather statistics for micro-haze uniformity. For each angular position of the first light detector with respect to the in-line direction, the light transmitted through the sample was measured as a function of position across the sample. The measurement at each lateral position took 1 second. In this way, the angular spectrum of scattered light was obtained for each lateral position of interest on the sample. The angle subtended by the first light detector at each angular measurement position was 0.2° in the measurement plane and 0.85° normal to the measurement plane. From these angular scatter light intensities, the light intensity proportional to the direct beam (the beam diverging from the focused spot with the same angle as the convergence angle of the original incident beam) and the light intensity proportional to the scattered beam are calculated. The direct beam measurement included light between 0° and 5.8° (the angle between the optic axis and the edge of the direct beam, determined by measuring the beam with no sample in place). The scattered beam measurement included the light projecting between 5.8° to 15.8° (representative of light scattered out of the direct beam into the first 10° adjacent to the direct beam). From these two values the fractional micro-haze was calculated. This is defined as the ratio of scattered beam intensity to the sum of scattered plus transmitted direct beam. Normalizing in this way negates the effects of absorption and front surface reflections from the micro-haze calculation.

During the measurement, the beam was physically chopped at around 2.04 kHz and both the detected signal and the source laser intensity were measured with a lock-in amplifier. This chopping frequency was in the low noise and flat frequency response range of the photodetectors. Lock-in detection enabled intensity measurements over more than 4 orders of magnitude, which is helpful when making measurements of low haze samples, where there is a large difference in the intensities of the direct beam and scattered beam. The micro-haze uniformity is defined as the standard deviation of the fractional micro-haze divided by the mean fractional micro-haze measurement itself. In this way, the micro-haze uniformity metric is functionally a noise-to-signal ratio.

Example 1

For Example 1 (Ex 1), the "Optical Property Test Method: Micro-Haze Uniformity" described above was used to obtain microscatterometry profiles of optical glass obtained under the trade designation "FISHERBRAND MICROSCOPE SLIDES 12-550B" from Fisher Scientific, Pittsburgh, Pa. The microscatterometry profiles were measured in 10 micrometer steps over 0.5 mm. The micro-haze measurement results are summarized in Table 2, below.

TABLE 2

| Example | Estimated Coating Thickness, micrometers | Micro-haze | | | Widest Peak, micrometers |
| --- | --- | --- | --- | --- | --- |
| | | Mean | STD | STD/Mean | |
| Ex 1 | — | 0.0011 | 0.0003 | 27% | 50 |
| Ex 2 | 50 | 0.0891 | 0.0092 | 10% | 500 |
| Ex 3 | 25 | 0.0783 | 0.0094 | 12% | 50 |
| Ex 4 | 25 | 0.0800 | 0.0090 | 11% | 150 |
| Ex 5 | 50 | 0.1150 | 0.0104 | 9% | 100 |
| Ex 6 | 50 | 0.2082 | 0.0257 | 12% | 300 |
| Ex 7 | 50 | 0.2114 | 0.0273 | 13% | 150 |
| Ex 8 | 15 | 0.1079 | 0.0203 | 19% | 500 |

Using the high-lateral resolution capability, it was observed that there were two regions of relatively high haze (i.e., $1.6 \times 10^{-3}$ and $2.2 \times 10^{-3}$, respectively), which were 50 micrometers wide.

These regions would appear as point defects in a system used in visual viewing.

Polymeric Film Examples 2-8 (Ex 2-8)

Diffusive polymeric film examples were fabricated in the general product configuration or embodiment of a single optically diffusing adhesive layer, which is represented in Examples 2-8. Examples 2-8 were coated from 100% solids.

Examples 2-8

Formulations 1-3 were prepared for Examples 2-5 by adding different levels of silicone beads (2.0 micrometers, monodispersed) ("TOSPEARL 120A") to an adhesive solution prepared as follows (summarized in Table 3, below).

TABLE 3

| Formulation Number | Silicone Beads ("TOSPEARL 120A"), grams | Adhesive Solution, grams | Particle Loading, wt. % |
| --- | --- | --- | --- |
| 1 | 3.0 | 297 | 1% |
| 2 | 4.5 | 295.5 | 1.5% |
| 3 | 6 | 294 | 2.0% |

A monomer premix was prepared by adding 2-ethylhexyl acrylate ("EHA") (55 parts), isobornyl acrylate ("iBOA") (25 parts), 2-hydroxyethyl acetate ("HEA") (20 parts), and 0.02 part of 2-Hydroxy-2-methyl-1-phenyl-propan-1-one ("D-1173"). The mixture was partially polymerized under a nitrogen (inert) atmosphere by exposure to ultraviolet radiation generated by an ultraviolet light emitting diode (UVA-LED) to provide a coatable syrup having a viscosity of about 1000 centipoise (cps). Then 1,6-hexandiol diacrylate ("HDDA") (0.15 part), alpha, alpha-dimethoxy-alpha-phenylacetophenone ("IRGACURE 651") (0.15 part), and 3-glycioxypropyl trimethoxysilane ("KBM-403") (0.05 part) were added to the syrup to form homogenous adhesive coating solution.

For Formulation 1 (1 wt. % particle loading), 3 grams of silicone beads (2.0 micrometers, monodispersed) ("TOSPEARL 120A") were added to 297 grams of adhesive solution and then mechanically stirred using an overhead mixer (obtained under the trade designation "JIFFY LM PINT" from Jiffy Mixer Co. Inc, Corona, Calif.) for 2 hours. After mechanical stirring, the admixture was placed on a mixing roller for an additional 24 hours.

For Formulation 2 (1.5 wt. % particle loading), 4.5 grams of silicone beads (2.0 micrometers, monodispersed) ("TOSPEARL 120A") were added to 295.5 grams of adhesive solution and then mechanically stirred using the overhead mixer ("JIFFY LM PINT") for 2 hours. After mechanical stirring, the admixture was placed on a mixing roller for an additional 24 hours.

For Formulation 3 (2 wt. % particle loading), 6 grams of silicone beads ("TOSPEARL 120A") were added to 294 grams of adhesive solution and then mechanically stirred using the overhead mixer ("JIFFY LM PINT") for 2 hours. After mechanical stirring, the admixture was placed on a mixing roller for an additional 24 hours.

Formulations 4 and 5, for Examples 6 and 7, were prepared by adding differing levels of silicone beads (4.5 micrometers, monodispersed) ("TOSPEARL 145") to base adhesive material prepared as follows (summarized in Table 4, below).

TABLE 4

| Formulation Number | Silicone Beads ("TOSPEARL 145"), grams | Adhesive Solution, grams | Particle Loading, wt. % |
|---|---|---|---|
| 4 | 9.0 | 291 | 3% |
| 5 | 11.4 | 288.6 | 3.8% |

A monomer premix was prepared by adding 2-ethylhexyl acrylate ("EHA") (50 parts), isobornyl acrylate ("iBOA") (30 parts), 2-hydroxyethyl acrylate ("HEA") (20 parts), and 0.02 part of 2-Hydroxy-2-methyl-1-phenyl-propan-1-one ("D-1173"). The mixture was partially polymerized under a nitrogen atmosphere by exposure to ultraviolet radiation generated by UVA-LED to provide a coatable syrup having a viscosity of about 750 cps. Then 1,6-hexadiol diacrylate ("HDDA") (0.08 part), alpha, alpha-dimethoxy-alpha-phenylacetophenone ("IRGACURE 651") (0.28 part), and 3-glyciodoxypropyl trimethoxysilane ("KBM-403") (0.05 part) were added to the syrup to form a homogenous adhesive coating solution.

For Formulation 8, 9 grams of silicone beads (4.5 micrometers, monodispersed) ("TOSPEARL 145") were added to 291 grams of base adhesive material. The mixture was then transferred to a closed container and placed on a mixing roller for additional 24 hours.

For Formulation 9, 11.4 grams of silicone beads (4.5 micrometers, monodispersed) ("TOSPEARL 145") were added to 288.6 grams of base adhesive material. The mixture was then transferred to a closed container and placed on a mixing roller for additional 24 hours.

Examples of polymeric diffusing films (Examples 2-7) were prepared by knife-coating the corresponding formulation between two silicone-treated release liners at a thickness of either 25 micrometers or 50 micrometers (summarized in Table 5, below).

TABLE 5

| Example Number | Formulation Number | Bead Loading, wt. % | Estimated Coating Thickness, micrometers |
|---|---|---|---|
| Ex 2 | 1 | 1.0 | 50 |
| Ex 3 | 2 | 1.5 | 25 |
| Ex 4 | 3 | 2.0 | 25 |
| Ex 5 | 3 | 2.0 | 50 |
| Ex 6 | 4 | 3 | 50 |
| Ex 7 | 5 | 3.8 | 50 |
| Ex 8 | 6 | Not applicable | 15 |

The resulting coated material was then exposed to low intensity ultraviolet radiation (a total energy of 1 Joule per square centimeter ($J/cm^2$)) having a spectral output from 300-400 nm with a maximum at 351 nm.

Example 8 (Ex 8)

A bottle polymer was prepared as Formulation 6, by polymerizing acrylate monomers in the presence of a silicone polymer (30% solid in ethyl acetate), which was prepared according to Example 13 of PCT Pub. No. WO2011/082069A1 modified by replacing m-xylyl-bisoxamic acid trifluoroethyl ester (Example 4 of WO 20111082069A1) with ethylene-bis-oxamic acid trifluoroethyl ester (Example 3 of PCT Pub. No. WO 2011/082069A1). The coating solution was prepared in a 16-ounce (473 ml) jar by mixing butyl acrylate ("BA") (100 parts), 2-hydroxyethyl acrylate ("HEA") (0.3 part), the silicone polymer solution (20 parts), and 2,2'-Azobis(2-methylbutyronitrile) ("VAZO 67") (0.3 part). Additional ethyl acetate was added to adjust weight percent solids to 30 wt. %. Finally, the jar was sealed after bubbling under nitrogen for 20 minutes, and it was transferred to a water bath with controlled temp of 65° C. for 16 hours. This resulted in a hazy coating solution.

The solution was then coated on a silicone coated polyester release liner ("RF12N") to form a 15-micrometer dry thick adhesive and then laminated with a silicone coated polyester release liner ("RF02N") after solvent was dried out. The resulting pressure sensitive adhesive (PSA) did not have good uniformity. An optical micrograph of the resulting PSA was taken. From optical micrographs, the phase separated "particle" sizes (actually not particles, but mixed phase spherical regions formed in situ) were estimated to range from 2-20 micrometers with a volume fraction estimated as approximately 20%.

For Examples 2-8, the "Optical Property Test Method: Micro-Haze Uniformity" described above was used to obtain microscatterometry profiles of polymer film samples composed of single-layer diffusing adhesive. Micro-haze measurements were taken over a 5-mm distance with a lateral resolution of 50 micrometers (results are summarized in Table 2, above). The peaks in the microhaze were mostly less than 150 micrometers wide. The widest peak was 500 micrometers wide; this would appear as a large dark spot in specular viewing and a bright spot in off-axis viewing.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of determining distinctiveness of image (DOI), the method comprising:
   providing a system comprising, in order:
      a light source;
      a focusing element;
      a sample that is at least one of transmissive or reflective of light of at least one wavelength in a range from 400 nm to 700 nm;
      an aperture; and
      a first light detector rotatable about a eucentric point,
   energizing the light source to provide a light beam having at least one wavelength of light in a range from 400 nm to 700 nm, wherein the light beam from the light source passes through and is focused by the focusing element to a spot either on or within the sample having an area in a range from 1 micrometer squared to 625 micrometers squared, wherein the sample holder translates in a plane orthogonal to the incident light beam, and wherein at least a portion of the light is transmitted through or reflected by the sample to provide scattered light;
   measuring the total intensity of the light beam received at the first light detector in the in-line direction for transmission or in the specular direction for reflection;
   measuring the intensity of the light beam received at the first light detector rotated 0.3° from the in-line direction for transmission or 0.3° from the specular direction for reflection; and
   calculating the DOI using the formula $100 \times (1-H_{0.3})$, where $H_{0.3}$ is the ratio of light beam intensity measured at 0.3° from the inline direction for transmission or 0.3° from the specular direction for reflection to the measured total intensity in the inline direction for transmission or in the specular direction for reflection, respectively.

2. The microscatterometry system of claim 1, wherein the focusing element is a spatial light modulator.

3. The microscatterometry system of claim 1, wherein the focusing element is a parabolic mirror.

4. The microscatterometry system of claim 1, further comprising an optical chopper positioned between the light source and the focusing element.

5. The microscatterometry system of claim 4, further comprising a light beam splitter positioned between the optical chopper and the focusing element to split a portion of the light beam to a second light detector.

6. The microscatterometry system of claim 5, further comprising a beam expanding spatial filter positioned between the light source and the focusing element.

7. The microscatterometry system of claim 1, further comprising a light beam splitter positioned between the light source and the focusing element to split a portion of the light beam to a second light detector.

8. The microscatterometry system of claim 7, further comprising a beam expanding spatial filter positioned between the light beam splitter and the focusing element.

9. The microscatterometry system of claim 8, wherein the light beam is comprised of pulsed light.

10. The microscatterometry system of claim 1, further comprising a beam expanding spatial filter positioned between the light source and the focusing element.

11. The microscatterometry system of claim 10, further comprising an optical chopper positioned between the light source and the beam expanding spatial filter.

12. The microscatterometry system of claim 11, wherein the light beam is comprised of pulsed light.

13. The method of claim 1, wherein the light source is a laser.

14. The method of claim 1, wherein the focusing element is a lens.

* * * * *